(12) United States Patent
Zhao et al.

(10) Patent No.: US 9,775,148 B2
(45) Date of Patent: Sep. 26, 2017

(54) METHOD, SYSTEM AND DEVICE FOR DETERMINING TRANSMISSION LINK TYPE

(71) Applicant: China Academy of Telecommunications Technology, Beijing (CN)

(72) Inventors: Rui Zhao, Beijing (CN); Qiubin Gao, Beijing (CN); Wenhong Chen, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/787,473

(22) PCT Filed: Apr. 28, 2014

(86) PCT No.: PCT/CN2014/076316
§ 371 (c)(1),
(2) Date: Oct. 28, 2015

(87) PCT Pub. No.: WO2014/177029
PCT Pub. Date: Nov. 6, 2014

(65) Prior Publication Data
US 2016/0105878 A1    Apr. 14, 2016

(30) Foreign Application Priority Data
Apr. 28, 2013    (CN) .......................... 2013 1 0156024

(51) Int. Cl.
*H04W 72/04* (2009.01)
*H04L 1/18* (2006.01)
(Continued)

(52) U.S. Cl.
CPC ......... *H04W 72/044* (2013.01); *H04L 1/1887* (2013.01); *H04L 5/0055* (2013.01);
(Continued)

(58) Field of Classification Search
None
See application file for complete search history.

(56) References Cited

U.S. PATENT DOCUMENTS 8,737,276 B2 * 5/2014 Madan ................ H04W 72/042
370/280
9,002,281 B2 * 4/2015 Fwu ....................... H04W 72/02
370/328

(Continued)

FOREIGN PATENT DOCUMENTS

CN      102395160 A    3/2012
CN      102958066 A    3/2013

(Continued)

OTHER PUBLICATIONS

European Search Report for EP 14791296 dated Jun. 6, 2016, 7 pages.
(Continued)

*Primary Examiner* — Eunsook Choi
(74) *Attorney, Agent, or Firm* — Kilpatrick Townsend & Stockton LLP

(57) ABSTRACT

The present invention relates to the technical field of wireless communications. Disclosed are a method, system and device for determining a transmission link type, to solve the receiving/transmitting duplexing problem in the prior art of a D2D link receiving terminal on a D2D link and an N2D link. The method comprises: a D2D receiving terminal reports to a network side device a first resource usage request on an N2D link, such that the network side device, after receiving the first resource usage request, determines the transmission link type of the D2D receiving terminal over a subframe n; and according to the type of the subframe n or the link type indication information received from the network side device, the D2D receiving terminal determines the transmission link type over the subframe n, the subframe
(Continued)

n being a D2D subframe. An embodiment of the present invention improves system resource utilization and system performance.

19 Claims, 5 Drawing Sheets

(51) Int. Cl.
H04L 5/00 (2006.01)
H04W 8/00 (2009.01)
H04W 72/10 (2009.01)
H04W 72/12 (2009.01)
H04W 76/04 (2009.01)
H04L 1/00 (2006.01)
H04W 92/18 (2009.01)

(52) U.S. Cl.
CPC ........... *H04W 8/005* (2013.01); *H04W 72/10* (2013.01); *H04W 72/12* (2013.01); *H04W 76/043* (2013.01); *H04L 2001/0096* (2013.01); *H04W 92/18* (2013.01)

(56) References Cited

U.S. PATENT DOCUMENTS

| | | | | |
|---|---|---|---|---|
| 9,042,938 B2* | 5/2015 | Nimbalker | .......... | H04W 72/048 455/550.1 |
| 2013/0003689 A1* | 1/2013 | Kwon | ................... | H04W 28/16 370/329 |
| 2015/0208401 A1* | 7/2015 | Lu | ....................... | H04W 76/021 455/452.1 |
| 2015/0373589 A1* | 12/2015 | Kwon | ................... | H04W 28/16 370/315 |
| 2016/0014831 A1* | 1/2016 | Lee | ....................... | H04W 8/005 370/329 |
| 2016/0029331 A1* | 1/2016 | Seo | ..................... | H04W 56/002 370/350 |
| 2016/0249198 A1* | 8/2016 | Kim | ...................... | H04W 48/16 |
| 2016/0360541 A1* | 12/2016 | Kim | ..................... | H04W 76/023 |

FOREIGN PATENT DOCUMENTS

| | | |
|---|---|---|
| CN | 103037517 A | 4/2013 |
| CN | 103069899 A | 4/2013 |
| WO | 2011/015250 A1 | 2/2011 |
| WO | 2011130626 A1 | 10/2011 |
| WO | 2013/000245 A1 | 1/2013 |

OTHER PUBLICATIONS

International Search Report and Written Opinion of PCT/CN2014/076316 (English and Chinese).

\* cited by examiner

METHOD, SYSTEM AND DEVICE FOR DETERMINING TRANSMISSION LINK TYPE

This application is a US National Stage of International Application No. PCT/CN2014/076316, filed on 28 Apr. 2014, designating the United States, and claiming the benefit of Chinese Patent Application No. 201310156024.1, filed with the State Intellectual Property Office of People's Republic of China on Apr. 28, 2013 and entitled "Method, system and device for determining type of transmission link", which is hereby incorporated by reference in its entirety.

FIELD

The present invention relates to the field of wireless communications and particularly to a method, system and device for determining type of transmission link.

BACKGROUND

In the traditional cellular communication technologies, a flow of data communication between two User Equipments (UEs) is as illustrated in FIG. 1. Voice, data and other traffic between the two UEs are exchanged through evolved NodeBs (eNBs) where they reside, and a core network.

The technology of Device to Device (D2D), namely a technology of D2D direct communication, refers to that data can be transmitted between adjacent UEs in a short-distance range over a direct link without being forwarded by a central node (i.e., a base station), as illustrated in FIG. 2. The D2D technology has the following advantages due to its short-distance communication characteristic and direct communication scheme:

The UEs can communicate directly with each other over a short distance at a higher data rate, with a lower delay, and with lower power consumption;

Spectrum resources can be accessed efficiently by the UEs widely distributed in a network due to the short-distance characteristic of the D2D communication link;

The D2D direct communication scheme can accommodate a demand of services, e.g., Peer to Peer (P2P) and other services, for sharing local data to thereby provide data services which can be adapted flexibly; and A coverage area of the network can be extended in D2D direct communication using a large number of communication UEs widely distributed in the network.

The Long Term Evolution (LTE) D2D technology refers to D2D communication via the LTE licensed frequency band controlled by an LTE network On one hand, the advantages of the D2D technology can be fully utilized, and on the other hand, some problems of the traditional D2D technology, e.g., uncontrollable interference, etc., can be overcome due to the control by the LTE network. The LTE D2D characteristic has been introduced to enable the LTE technology to evolve from the simple radio mobile cellular communication technology toward the universal connectivity technology.

For an uplink subframe/uplink carrier, a transmitting UE of the D2D link can perform transmission over an N2D link and the D2D link concurrently in the current D2D subframe, so there will be no concern with duplex transmission/reception over the D2D link and the N2D link. A receiving UE of the D2D link can not perform transmission over the N2D link and the D2D link concurrently in the current D2D subframe, so there will be a concern with duplex transmission/reception over the D2D link and the N2D link for the receiving UE of the D2D link.

In summary, there may be a concern with duplex transmission/reception over the D2D link and the N2D link for the receiving UE of the D2D link.

SUMMARY

The invention provides a method, system and device for determining type of transmission link so as to address the problem of duplex transmission/reception over a D2D link and an N2D link for a receiving UE of the D2D link in the prior art.

In a first aspect, a method for determining type of transmission link includes:

reporting, by a Device to Device (D2D) receiving UE, a first resource occupancy request over a Network to Device (N2D) link to a network-side device so that the network-side device determines a type of a transmission link of the D2D receiving UE in a subframe n upon reception of the first resource occupancy request; and determining, by the D2D receiving UE, the type of the transmission link in the subframe n according to the type of the subframe n or received link type indication information from the network-side device, wherein the subframe n is a D2D subframe.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

In connection with the first aspect, in a first possible implementation, determining, by the D2D receiving UE, the type of the transmission link in the subframe n according to the type of the subframe n includes:

if the subframe n is a subframe in which Acknowledgement (ACK)/Negative Acknowledgement (NACK) feedback information corresponding to Physical Downlink Shared Channel (PDSCH) transmission in the N2D link needs to be transmitted, then determining, by the D2D receiving UE, that the type of the transmission link in the subframe n is a D2D link or the N2D link, according to a preconfigured rule.

In connection with the first possible implementation of the first aspect, in a second possible implementation, after the D2D receiving UE determines the type of the transmission link in the subframe n, the method further includes:

performing, by the D2D receiving UE, D2D transmission in the subframe n upon determining that the type of the transmission link in the subframe n is the D2D link; or transmitting, by the D2D receiving UE, ACK/NACK feedback information corresponding to PDSCH transmission in the N2D link in the subframe n upon determining that the type of the transmission link in the subframe n is the N2D link.

In connection with the second possible implementation of the first aspect, in a third possible implementation, after the D2D receiving UE performs D2D transmission in the subframe n, the method further includes:

transmitting, by the D2D receiving UE, ACK/NACK feedback information corresponding to a PDSCH in the N2D link, in an uplink subframe, available for transmission in the N2D link, subsequent to the subframe n.

In connection with the first aspect or any one of the possible implementations above of the first aspect, in a fourth possible implementation, the link type indication information is an indication information to schedule a Physical Uplink Shared Channel (PUSCH) transmission of the N2D link in the subframe n; and determining, by the D2D receiving UE, the type of the transmission link in the subframe n according to the type of the subframe n or the received link type indication information from the network-side device includes:

determining, by the D2D receiving UE, that the N2D link is transmitted in the subframe n upon reception of the link type indication information from the network-side device in a subframe (n-k).

In connection with the fourth possible implementation of the first aspect, in a fourth possible implementation, after the D2D receiving UE determines that the N2D link is transmitted in the subframe n, the method further includes:

transmitting, by the D2D receiving UE, the PUSCH of the N2D link in the subframe n upon determining that the type of the transmission link in the subframe n is the N2D link.

In a second aspect, another method for determining type of transmission link includes:

determining, by a network-side device, that there is a data transmission request of a D2D receiving UE over an N2D link, according to a first resource occupancy request over the N2D link, reported by the D2D receiving UE; and determining, by the network-side device, a type of a transmission link of the D2D receiving UE in a subframe n, upon determining that there is a data transmission request of the D2D receiving UE over the N2D link, wherein the subframe n is a D2D subframe.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

In connection with the second aspect, in a first possible implementation, determining, by the network-side device, the type of the transmission link of the D2D receiving UE in the subframe n includes:

determining, by the network-side device, that the D2D receiving UE transmits a D2D link or the N2D link in the subframe n, upon determining that the subframe n is a subframe in which ACK/NACK feedback information corresponding to PDSCH transmission in the N2D link needs to be transmitted.

In connection with the first possible implementation of the second aspect, in a second possible implementation, after the network-side device determines the type of the transmission link of the D2D receiving UE in the subframe n, the method further includes:

if the network-side device determines that the D2D receiving UE transmits the D2D link in the subframe n, then receiving, by the network-side device, ACK/NACK feedback information corresponding to a PDSCH in the N2D link from the D2D receiving UE in an uplink subframe, available for transmission in the N2D link, subsequent to the subframe n; or if the network-side device determines that the D2D receiving UE transmits the N2D link in the subframe n, then receiving, by the network-side device, ACK/NACK feedback information corresponding to a PDSCH in the N2D link from the D2D receiving UE in the subframe n.

In connection with the second aspect, in a third possible implementation, determining, by the network-side device, the type of the transmission link of the D2D receiver in the subframe n includes:

determining, by the network-side device, that a PUSCH of the N2D link needs to be transmitted in the subframe n, according to the first resource occupancy request; and determining, by the network-side device, that the D2D receiving UE transmits the N2D link or the D2D link in the subframe n, according to a service priority or a preconfigured rule.

In connection with the third possible implementation of the second aspect, in a fourth possible implementation, determining, by the network-side device, that the D2D receiving UE transmits the N2D link or the D2D link in the subframe n, according to a service priority includes:

determining, by the network-side device, whether a first priority corresponding to a service transmitted in the PUSCH of the N2D link is no lower than a second priority corresponding to a service transmitted over the D2D link, wherein the first priority is determined by the network-side device according to the first resource occupancy request, and the second priority is determined by the network-side device according to a second resource occupancy request over the D2D link, reported by a D2D transmitting UE; and if so, then determining that the D2D receiving UE transmits the N2D link in the subframe n; otherwise, determining that the D2D receiving UE transmits the D2D link in the subframe n.

In connection with the third possible implementation of the second aspect, in a fifth possible implementation, after the network-side device determines the type of the transmission link of the D2D receiving UE in the subframe n, the method further includes:

if the network-side device determines that the D2D receiving UE transmits the N2D link in the subframe n, then sending, by the network-side device, an indication information to the D2D receiving UE in a subframe (n-k) to schedule PUSCH transmission of the N2D link in the subframe n.

In connection with any one of the third to fifth possible implementations of the second aspect, in a sixth possible implementation, after the network-side device determines the type of the transmission link of the D2D receiving UE in the subframe n, the method further includes:

if the network-side device determines that the D2D receiving UE transmits the N2D link in the subframe n, then receiving, by the network-side device, a PUSCH from the D2D receiving UE in the subframe n.

In a third aspect, a D2D receiving UE for determining type of transmission link includes:

a reporting module configured to report a first resource occupancy request over an N2D link to a network-side device so that the network-side device determines a type of a transmission link of the D2D receiving UE in a subframe n upon reception of the first resource occupancy request; and a first determining module configured to determine the type of the transmission link in the subframe n according to the type of the subframe n or received link type indication information from the network-side device, wherein the subframe n is a D2D subframe.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

In connection with the third aspect, in a first possible implementation, the first determining module is configured:

if the subframe n is a subframe in which ACK/NACK feedback information corresponding to PDSCH transmission in the N2D link needs to be transmitted, to determine that the type of the transmission link in the subframe n is a D2D link or the N2D link, according to a preconfigured rule.

In connection with the first possible implementation of the third aspect, in a second possible implementation, the first determining module is further configured:

to perform D2D transmission in the subframe n upon determining that the type of the transmission link in the subframe n is the D2D link; or to transmit ACK/NACK feedback information corresponding to PDSCH transmission in the N2D link in the subframe n upon determining that the type of the transmission link in the subframe n is the N2D link.

In connection with the second possible implementation of the third aspect, in a third possible implementation, the first determining module is further configured:

to transmit ACK/NACK feedback information corresponding to a PDSCH in the N2D link, in an uplink subframe, available for transmission in the N2D link, subsequent to the subframe n, after performing D2D transmission in the subframe n.

In connection with the third aspect or any one of the possible implementations above of the third aspect, in a fourth possible implementation, the link type indication information is an indication information to schedule a Physical Uplink Shared Channel (PUSCH) transmission of the N2D link in the subframe n; and the first determining module is configured:

to determine that the N2D link is transmitted in the subframe n upon reception of the link type indication information from the network-side device in a subframe (n-k).

In connection with the fourth possible implementation of the third aspect, in a fifth possible implementation, the first determining module is further configured:

to transmit the PUSCH of the N2D link in the subframe n upon determining that the type of the transmission link in the subframe n is the N2D link.

In a fourth aspect, a network-side device for determining type of transmission link includes:

a receiving module configured to determine that there is a data transmission request of a D2D receiving UE over an N2D link, according to a first resource occupancy request over the N2D link, reported by the D2D receiving UE; and a second determining module configured to determine a type of a transmission link of the D2D receiving UE in a subframe n, upon determining that there is a data transmission request of the D2D receiving UE over the N2D link, wherein the subframe n is a D2D subframe.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

In connection with the fourth aspect, in a first possible implementation, the second determining module is configured:

to determine that the D2D receiving UE transmits a D2D link or the N2D link in the subframe n, upon determining that the subframe n is a subframe in which ACK/NACK feedback information corresponding to PDSCH transmission in the N2D link needs to be transmitted.

In connection with the first possible implementation of the fourth aspect, in a second possible implementation, the second determining module is further configured:

if it is determined that the D2D receiving UE transmits the D2D link in the subframe n, to receive ACK/NACK feedback information corresponding to a PDSCH in the N2D link from the D2D receiving UE in an uplink subframe, available for transmission in the N2D link, subsequent to the subframe n; or if it is determined that the D2D receiving UE transmits the N2D link in the subframe n, to receive ACK/NACK feedback information corresponding to a PDSCH in the N2D link from the D2D receiving UE in the subframe n.

In connection with the fourth aspect, in a third possible implementation, the second determining module is configured:

to determine that a PUSCH of the N2D link needs to be transmitted in the subframe n, according to the first resource occupancy request; and to determine that the D2D receiving UE transmits the N2D link or the D2D link in the subframe n, according to a service priority or a preconfigured rule.

In connection with the third possible implementation of the fourth aspect, in a fourth possible implementation, the second determining module is configured:

to determine whether a first priority corresponding to a service transmitted in the PUSCH of the N2D link is no lower than a second priority corresponding to a service transmitted over the D2D link, wherein the first priority is determined by the network-side device according to the first resource occupancy request, and the second priority is determined by the network-side device according to a second resource occupancy request over the D2D link, reported by a D2D transmitting UE; and if so, to determine that the D2D receiving UE transmits the N2D link in the subframe n; otherwise, to determine that the D2D receiving UE transmits the D2D link in the subframe n.

In connection with the third possible implementation of the fourth aspect, in a fifth possible implementation, the second determining module is further configured:

if it is determined that the D2D receiving UE transmits the N2D link in the subframe n, to send an indication information to the D2D receiving UE in a subframe (n-k) to schedule PUSCH transmission of the N2D link in the subframe n.

In connection with the fourth aspect or any one of the possible implementations above of the fourth aspect, in a sixth possible implementation, the second determining module is further configured:

if it is determined that the D2D receiving UE transmits the N2D link in the subframe n, to receive a PUSCH from the D2D receiving UE in the subframe n.

In a fifth aspect, a D2D receiving UE for determining type of transmission link includes:

a sending port 90 configured to report a first resource occupancy request over an N2D link to a network-side device so that the network-side device determines a type of a transmission link of the D2D receiving UE in a subframe n upon reception of the first resource occupancy request; and a first processor configured to determine the type of the transmission link in the subframe n according to the type of the subframe n or received link type indication information from the network-side device, where the subframe n is a D2D subframe.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

In connection with the fifth aspect, in a first possible implementation, the first processor is configured:

if the subframe n is a subframe in which ACK/NACK feedback information corresponding to PDSCH transmission in the N2D link needs to be transmitted, to determine that the type of the transmission link in the subframe n is a D2D link or the N2D link, according to a preconfigured rule.

In connection with the first possible implementation of the fifth aspect, in a second possible implementation, the first processor is further configured:

to perform D2D transmission in the subframe n upon determining that the type of the transmission link in the subframe n is the D2D link; or to transmit ACK/NACK feedback information corresponding to PDSCH transmission in the N2D link in the subframe n upon determining that the type of the transmission link in the subframe n is the N2D link.

In connection with the second possible implementation of the fifth aspect, in a third possible implementation, the first processor is further configured:

to transmit ACK/NACK feedback information corresponding to a PDSCH in the N2D link, in an uplink subframe, available for transmission in the N2D link, subsequent to the subframe n, after performing D2D transmission in the subframe n.

In connection with the fifth aspect or any one of the possible implementations above of the fifth aspect, in a fourth possible implementation, the link type indication information is an indication information to schedule a Physical Uplink Shared Channel (PUSCH) transmission of the N2D link in the subframe n; and the first processor is configured:

to determine that the N2D link is transmitted in the subframe n upon reception of the link type indication information from the network-side device in a subframe (n−k).

In connection with the fourth possible implementation of the fifth aspect, in a fourth possible implementation, the first processor is further configured:

to transmit the PUSCH of the N2D link in the subframe n upon determining that the type of the transmission link in the subframe n is the N2D link.

In a sixth aspect, a network-side device for determining type of transmission link includes:

a receiving port configured to determine that there is a data transmission request of a D2D receiving UE over an N2D link, according to a first resource occupancy request over the N2D link, reported by the D2D receiving UE; and a second processor configured to determine a type of a transmission link of the D2D receiving UE in a subframe n, upon determining that there is a data transmission request of the D2D receiving UE over the N2D link, where the subframe n is a D2D subframe.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

In connection with the sixth aspect, in a first possible implementation, the second processor is configured:

to determine that the D2D receiving UE transmits a D2D link or the N2D link in the subframe n, upon determining that the subframe n is a subframe in which ACK/NACK feedback information corresponding to PDSCH transmission in the N2D link needs to be transmitted.

In connection with the first possible implementation of the sixth aspect, in a second possible implementation, the second processor is further configured:

if it is determined that the D2D receiving UE transmits the D2D link in the subframe n, to receive ACK/NACK feedback information corresponding to a PDSCH in the N2D link from the D2D receiving UE in an uplink subframe, available for transmission in the N2D link, subsequent to the subframe n; or if it is determined that the D2D receiving UE transmits the N2D link in the subframe n, to receive ACK/NACK feedback information corresponding to a PDSCH in the N2D link from the D2D receiving UE in the subframe n.

In connection with the sixth aspect, in a third possible implementation, the second processor is configured:

to determine that a PUSCH of the N2D link needs to be transmitted in the subframe n, according to the first resource occupancy request; and to determine that the D2D receiving UE transmits the N2D link or the D2D link in the subframe n, according to a service priority or a preconfigured rule.

In connection with the third possible implementation of the sixth aspect, in a fourth possible implementation, the second processor is configured:

to determine whether a first priority corresponding to a service transmitted in the PUSCH of the N2D link is no lower than a second priority corresponding to a service transmitted over the D2D link, where the first priority is determined by the network-side device according to the first resource occupancy request, and the second priority is determined by the network-side device according to a second resource occupancy request over the D2D link, reported by a D2D transmitting UE; and if so, to determine that the D2D receiving UE transmits the N2D link in the subframe n; otherwise, to determine that the D2D receiving UE transmits the D2D link in the subframe n.

In connection with the third possible implementation of the sixth aspect, in a fifth possible implementation, the second processor is further configured:

if it is determined that the D2D receiving UE transmits the N2D link in the subframe n, to send an indication information to the D2D receiving UE in a subframe (n−k) to schedule PUSCH transmission of the N2D link in the subframe n.

In connection with the sixth aspect or any one of the possible implementations above of the sixth aspect, in a sixth possible implementation, the second processor is further configured:

if it is determined that the D2D receiving UE transmits the N2D link in the subframe n, to receive a PUSCH from the D2D receiving UE in the subframe n.

In a seventh aspect, a system for determining type of transmission link includes:

a D2D receiving UE configured to report a first resource occupancy request over an N2D link to a network-side device; and to determine a type of a transmission link in a subframe n according to the type of the subframe n or received link type indication information, wherein the subframe n is a D2D subframe; and the network-side device configured to determine that there is a data transmission request of the D2D receiving UE over the N2D link, according to the first resource occupancy request over the N2D link, reported by the D2D receiving UE; and to determine the type of the transmission link of the D2D receiving UE in the subframe n, upon determining that there is a data transmission request of the D2D receiving UE over the N2D link.

Since the D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

DETAILED DESCRIPTION OF THE EMBODIMENTS

In order to make the objects, technical solutions and advantages of the embodiments of the invention more apparent, the technical solutions according to the embodiments of the invention will be described clearly and fully in further details with reference to the drawings in the embodiments of the invention, and apparently the embodiments described below are only some but not all of the embodiments of the invention. All the other embodiments which can occur to those ordinarily skilled in the art based upon the embodiments here of the invention without any inventive effort shall fall into the scope of the invention as claimed.

According to the embodiments of the invention, a D2D receiving UE reports a first resource occupancy request over an N2D link to a network-side device so that the network-side device determines the type of a transmission link of the D2D receiving UE in a subframe n upon reception of the first resource occupancy request; and the D2D receiving UE determines the type of the transmission link in the subframe n according to the type of the subframe n or received link type indication information, where the subframe n is a D2D subframe. The D2D receiving UE and the network-side device can determine the type of the transmission link in the D2D subframe respectively, so that if the D2D receiving UE needs to transmit/receive over a D2D link and an N2D link, then a transmission scheme can be determined according to the determined type of the transmission link in the D2D subframe, thus providing a solution to addressing duplex transmission/reception by the receiving UE of the D2D link over the D2D link and the N2D link to thereby improve a utilization ratio of resources in the system, and the performance of the system.

Figure 1A:
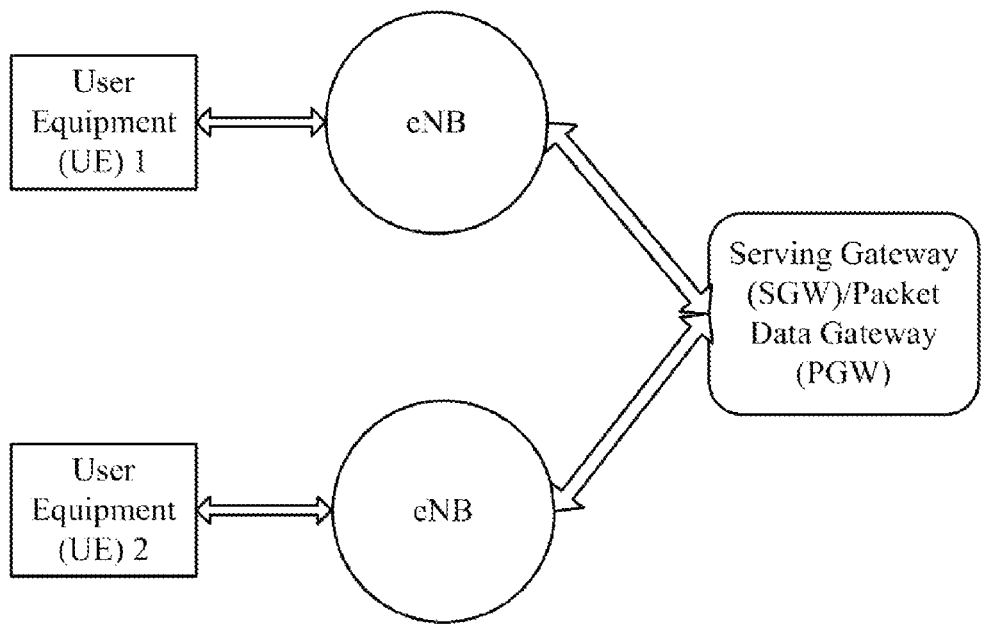
FIG. 1A illustrates a schematic diagram of a data flow in communication between UEs in the cellular network in the prior art.
Figure 1B:
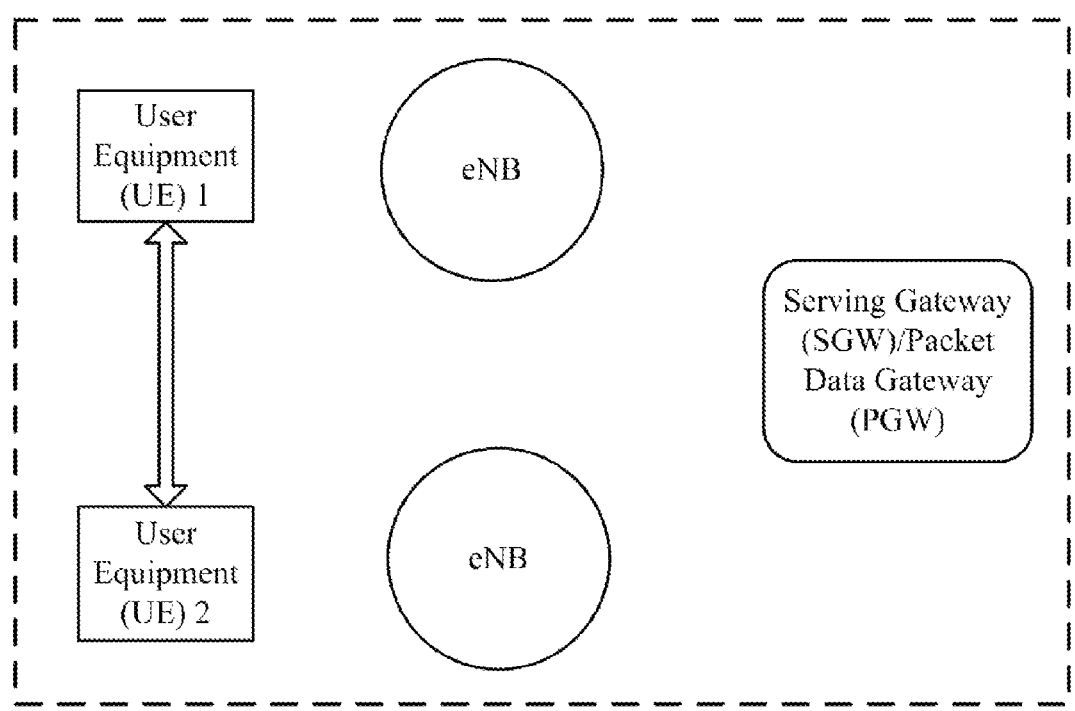
FIG. 1B illustrates a schematic diagram of a data flow in direction communication between UEs in the prior art.
Figure 2:
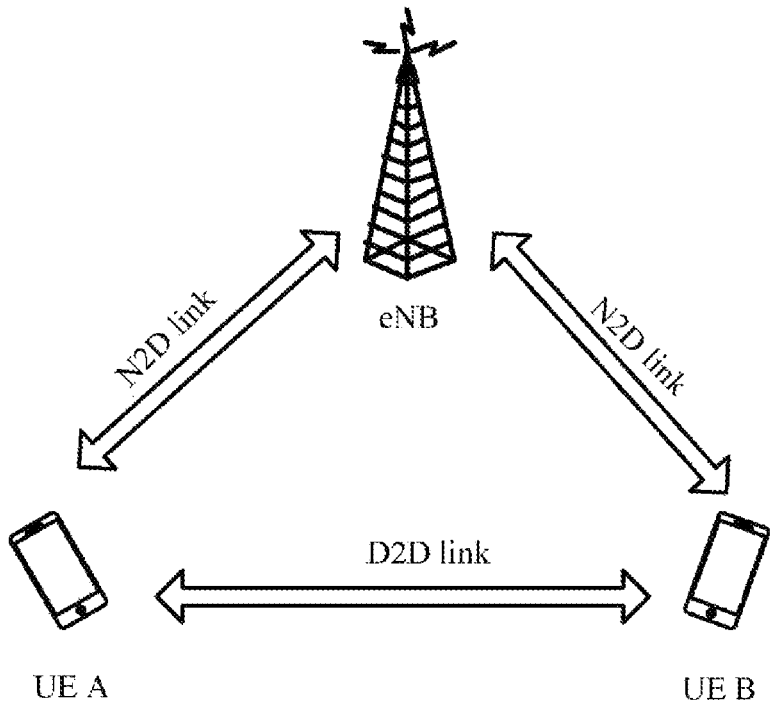
FIG. 2 illustrates a schematic diagram of direct communication between UEs according to an embodiment of the invention.

The D2D link in the embodiments of the invention is a device to device link; and the N2D link is a network to device link, particularly as illustrated in FIG. 2.

For example, as illustrated in FIG. 2, the network side instructs a UE A over an N2D link to transmit data over a D2D link; and the UE A transmits data over the D2D link upon reception of the instruction of the network-side device.

The network side instructs a UE B over an N2D link to transmit data over the D2D device; and the UE B transmits data over the D2D link upon reception of the instruction of the network-side device.

It shall be noted that there is D2D transmission between the two UEs in FIG. 2, but more UEs can transmit as needed, for example, one UE can transmit, and more than one UE can receive.

Figure 5:
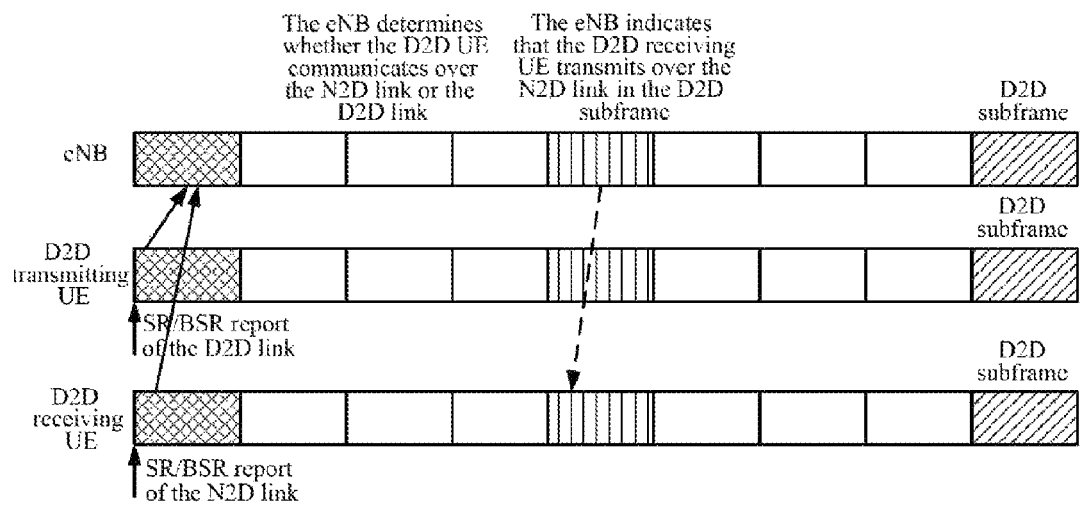
FIG. 5 illustrates a schematic diagram of transmission according to an embodiment of the invention.

In an implementation, for a pair of UEs in D2D communication according to the embodiments of the invention, the D2d receiving UE reports a first resource occupancy request over cellular communication (an N2D link), and the D2D transmitting UE can report a second resource occupancy request over a D2D link, before a D2D subframe, as illustrated in FIG. 5.

In the embodiments of the invention, the first resource occupancy request can be a Scheduling Request (SR)/Buffer State Report (BSR) for cellular network (N2D link) communication in an LTE/LTE-A system; and the second resource occupancy request can be an SR/BSR for the D2D link.

Here the SR for the N2D link is an SR resource configured by the network side for a cellular UE (which can be a D2D UE here) to indicate to the UE whether there is uplink data transmission over the N2D link. The BSR report over the N2D link indicates the amount of data, reported by the cellular UE (which is the D2D UE in the embodiments of the invention) to an eNB, in a buffer of the UE currently for uplink transmission over the N2D link.

Here the SR for the D2D link is an SR resource configured by the network for the D2D UE to notify the eNB whether there are data of the D2D UE to be transmitted over the D2D link, where the SR resource can coexist as the SR resource over the N2D link. The BSR report over the D2D link indicates the amount of data, reported by the D2D UE to the eNB, in a buffer of the D2D UE currently to be transmitted over the D2D link.

Figure 3:
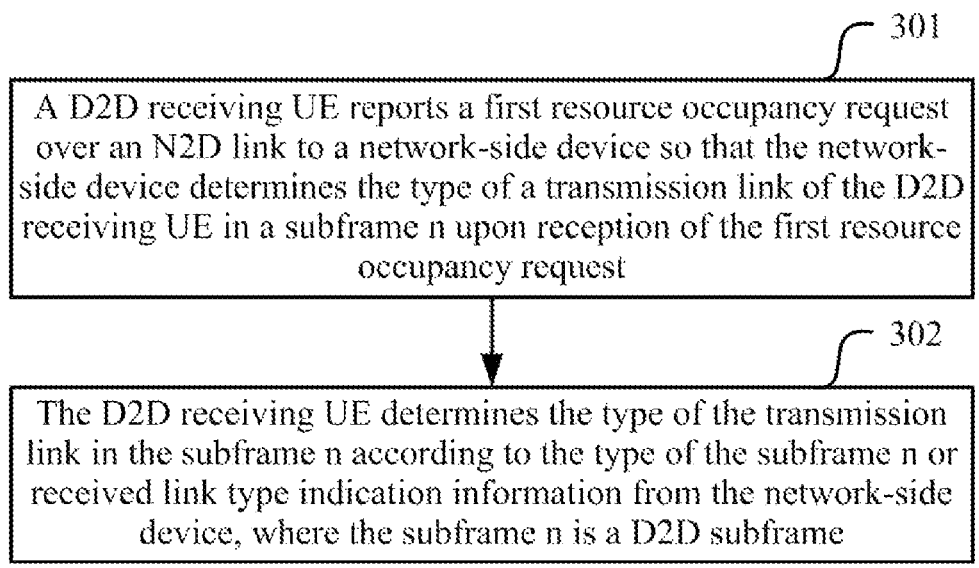
FIG. 3 illustrates a schematic flow chart of a method for determining the type of a transmission link by a UE according to an embodiment of the invention.

As illustrated in FIG. 3, a method for determining the type of a transmission link according to an embodiment of the invention includes the following steps:

In the step 301, a D2D receiving UE reports a first resource occupancy request over an N2D link to a network-side device so that the network-side device determines the type of a transmission link of the D2D receiving UE in a subframe n upon reception of the first resource occupancy request; and In the step 302, the D2D receiving UE determines the type of the transmission link in the subframe n according to the type of the subframe n or received link type indication information from the network-side device, where the subframe n is a D2D subframe.

Here the D2D receiving UE can determine the type of the transmission link in the subframe n in a number of approaches, several of which will be listed below.

In a first approach, the D2D receiving UE determines the type of the transmission link in the subframe n according to the type of the subframe n.

If the subframe n is a subframe in which Acknowledge (ACK)/Negative Acknowledge (NACK) feedback information corresponding to Physical Downlink Shared Channel (PDSCH) transmission in the N2D link needs to be transmitted, then the UE determines that the type of the transmission link in the subframe n is the D2D link or the N2D link, according to a preconfigured rule.

If the subframe n is a subframe in which ACK/NACK feedback information corresponding to PDSCH transmission in the N2D link needs to be transmitted, then the UE can determine whether the D2D link or the N2D link is transmitted in the subframe n, as specified in a protocol, according to a preconfigured rule, or can receive a notification of the network side, and determine it according to the notification of the network side, according to a preconfigured rule.

In a first scheme, the D2D receiving UE performs D2D transmission in the subframe n, that is, the D2D receiving UE receives the D2D link, upon determining that the type of the transmission link in the subframe n is the D2D link. Preferably the D2D receiving UE transmits ACK/NACK feedback information corresponding to a PDSCH in the N2D link, in an uplink subframe, available for transmission in the N2D link, subsequent to the subframe n.

In a second scheme, the D2D receiving UE transmits ACK/NACK feedback information corresponding to a PDSCH in the N2D link, in the subframe n upon determining that the type of the transmission link in the subframe n is the N2D link. That is, the D2D receiving UE transmits uplink ACK/NACK of the N2D link in the D2D subframe, but does not receive data of the D2D link in the D2D subframe. Preferably the data of the D2D link can be retransmitted by the transmitting UE.

Taking an FDD system as an example, if the D2D receiving UE receives transmission of a PDSCH in the subframe 1, then it will feed back ACK/NACK feedback information in the subframe 5 according a relationship of HARQ timing in the FDD system, but the subframe 5 is a subframe in which the D2D receiving UE receives. In the first scheme, the D2D receiving UE receives the D2D link in the subframe 5, but feeds back ACK/NACK corresponding to a PDSCH in the subframe 6. In the second scheme, the D2D receiving UE feeds back ACK/NACK of a PDSCH in the subframe 5, which is transmitted over a Physical Uplink Control Channel (PUCCH).

In a Time Division Duplex (TDD) system, the UE will determine a subframe of ACK/NACK feedback information corresponding to PDSCH transmission according to an Uplink (UP)/Downlink (DL) subframe configuration of TDD.

In a second approach, the D2D receiving UE determines the type of the transmission link in the subframe n according to the received link type indication information from the network-side device.

Here the link type indication information is an indication information to schedule a Physical Uplink Shared Channel (PUSCH) transmission of the N2D link in the subframe n.

If the D2D receiving UE receives the link type indication information from the network-side device in the subframe (n-k), then it determines that the N2D link is transmitted in the subframe n.

If the D2D receiving UE does not receive the link type indication information in the subframe (n-k), then it determines that the D2D link is transmitted in the subframe n.

The value of k here can be set as needed. Taking an LTE system as an example, preferably k can be fixed to 4 in Frequency Division Duplex (FDD); and k is determined by an uplink/downlink subframe configuration in TDD, and a correspondence relationship between a signaling indicator and a D2D subframe in the TDD system agrees with a timing relationship between an Uplink (UL) grant and a PUSCH, for details of which reference can be made to the 3GPP TS 36.213 protocol, although a repeated description thereof will be omitted here.

The second approach will be described below in two instances:

First Instance:

For a PUSCH of Semi-Persistent Scheduling (SPS) over the N2D link of the D2D receiving UE, a subframe in which it is transmitted is configured by a higher layer. In a scheme, the D2D subframe, and the subframe in which a PUSCH of SPS is transmitted can be configured as subframes which do not overlap with each other. In another scheme, if the D2D subframe overlaps with the subframe in which a PUSCH of SPS is transmitted, then it can be indicated in an SPS PUSCH re-scheduling procedure, that is, a UL grant can be indicated for the PUSCH of SPS.

If the D2D subframe overlaps with the subframe in which a PUSCH of SPS is transmitted, then the eNB can determine whether a PUSCH is transmitted over the N2D link in the D2D subframe n, and if a PUSCH is transmitted over the N2D link, then the eNB will send a UL grant for the PUSCH over the N2D link, in the subframe (n-k), and the D2D receiving UE will transmit the PUSCH in the subframe n; otherwise, the eNB will not send a UL grant for the PUSCH over the N2D link, in the subframe (n-k), and the D2D receiving UE will transmit the D2D link in the subframe n.

Second Instance:

In order to indicate a retransmission procedure of a PUSCH for ACK/NACK in a PHICH over the N2D link of the D2D receiving UE, since synchronous/asynchronous retransmission of a UL PUSCH is supported in the LTE system, synchronous retransmission is performed after a fixed subframe offset by receiving an indicator of the PHICH, and asynchronous retransmission is performed by scheduling retransmission in a UL grant, and indicating in a New Data Indicator (NDI) whether the current PUSCH relates to a retransmitted data packet, no matter whether ACK/NACK is fed back in the corresponding PHICH at this time.

If a subframe, in which the PUSCH is retransmitted, indicated in the PHICH overlaps with the D2D subframe, then the eNB can determine whether to retransmit the PUSCH over the N2D link in the D2D subframe n, and if the PUSCH is retransmitted over the N2D link, then the eNB will send a UL grant for the PUSCH over the N2D link, in the subframe (n-k), and the D2D receiving UE will transmit the PUSCH in the subframe n; otherwise, the eNB will send a UL grant for the PUSCH over the N2D link, in the subframe (n-k), and the D2D receiving UE will transmit the PUSCH in the subframe n.

In a third approach, which is a combination of the first approach and the second approach, the D2D receiving UE receives an indication information to schedule PUSCH transmission of the N2D link in the subframe n, from the network-side device in the subframe (n-k), where the subframe n is a subframe in which ACK/NACK feedback information corresponding to PDSCH transmission in the N2D link needs to be transmitted, and at this time, only one of the scenarios can be preset to be applied. For example, only the first approach or the second approach will be applied in the scenario in the third approach above. Alternatively the first approach or the second approach to be applied can be notified by the network side to the D2D receiving UE. Alternatively the D2D receiving UE can compare a priority of ACK/NACK feedback information with a priority of a service transmitted over the PUSCH, and if the priority of the service transmitted over the PUSCH is higher, then the second approach will be applied; otherwise, the first approach will be applied. The priorities can be set in the protocol or can be notified by the network side.

Figure 4:
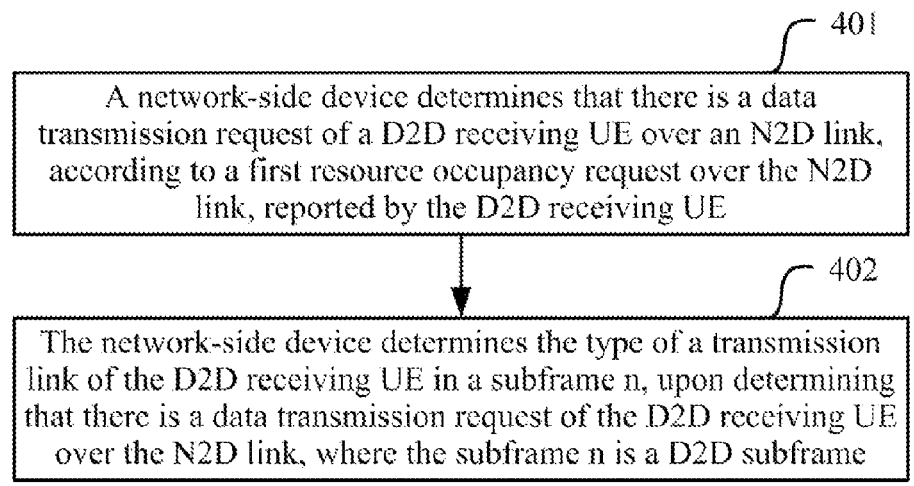
FIG. 4 illustrates a schematic flow chart of a method for determining the type of a transmission link by a network-side device according to an embodiment of the invention.

As illustrated in FIG. 4, a method for determining the type of a transmission link according to an embodiment of the invention includes the following steps:

In the step 401, a network-side device determines that there is a data transmission request of a D2D receiving UE over an N2D link, according to a first resource occupancy request over the N2D link, reported by the D2D receiving UE; and In the step 402, the network-side device determines the type of a transmission link of the D2D receiving UE in a subframe n, upon determining that there is a data transmission request of the D2D receiving UE over the N2D link, where the subframe n is a D2D subframe.

Since the first resource occupancy request is request information indicating that there are data of a transmitting UE to be transmitted over the N2D link, the network-side device can determine that there is a data transmission request of the D2D receiving UE over the N2D link, according to the first resource occupancy request.

Here the network-side device can determine the type of the transmission link of the D2D receiving UE in the subframe n in a number of approaches, several of which will be listed below.

In a first approach, the network-side device determines that the D2D receiving UE transmits a D2D link or the N2D link in the subframe n, upon determining that the subframe n is a subframe in which ACK/NACK feedback information corresponding to PDSCH transmission in the N2D link needs to be transmitted.

If the subframe n is a subframe in which ACK/NACK feedback information corresponding to PDSCH transmission in the N2D link needs to be transmitted, whether the D2D link or the N2D link is transmitted in the subframe n can be specified in a protocol or can be determined and then notified by the network side to the UE.

In a first scheme, if the network-side device determines that the D2D receiving UE transmits the D2D link in the subframe n, then the network-side device receives ACK/NACK feedback information corresponding to a PDSCH in the N2D link from the D2D receiving UE in an uplink subframe, available for transmission in the N2D link, subsequent to the subframe n.

In a second scheme, if the network-side device determines that the D2D receiving UE transmits the N2D link in the subframe n, then the network-side device receives ACK/NACK feedback information corresponding to a PDSCH in the N2D link from the D2D receiving UE in the subframe n.

In a second approach, the network-side device determines that a PUSCH of the N2D link needs to be transmitted in the subframe n, according to the first resource occupancy request; and determines that the D2D receiving UE transmits the N2D link or the D2D link in the subframe n, according to a service priority or a preconfigured rule.

If the network-side device determines that the UE transmits the D2D link or the N2D link in the subframe n, according to a preconfigured rule, then this can be determined as specified in the protocol, according to a preconfigured rule, or can be determined and then notified by the network-side device to the UE according to a preconfigured rule.

If the network-side device determines that the UE transmits the D2D link or the N2D link in the subframe n, according to a service priority, then preferably:

The network-side device determines whether a first priority corresponding to a service transmitted over the PUSCH is no lower than a second priority of a service transmitted over the D2D link, where the first priority is determined by the network-side device according to the first resource occupancy request, and the second priority is determined by the network-side device according to a second resource occupancy request over the D2D link, reported by the D2D transmitting UE; and If so, then the network-side device determines that the D2D receiving UE transmits the N2D link in the subframe n; otherwise, the network-side device determines that the D2D receiving UE transmits the D2D link in the subframe n.

It shall be noted that in the embodiment of the invention, if a PUSCH of the N2D link needs to be transmitted in the subframe n, then the network-side device may not determine whether the D2D link or the N2D link is transmitted in the subframe n, in the priority-based approach above, but can determine this in any other such approach that the network-side device can determine whether the D2D link or the N2D link is transmitted in the subframe n.

Preferably if the network-side device determines that the D2D receiving UE transmits the D2D link in the subframe n, then the network-side device sends an indication information to the D2D receiving UE in the subframe (n-k) to schedule PUSCH transmission of the N2D link in the subframe n.

The value of k here can be set as needed. Taking an LTE system as an example, preferably k can be fixed to 4 in FDD; and k is determined by an uplink/downlink subframe configuration in TDD, and a correspondence relationship between a signaling indicator and a D2D subframe in the TDD system agrees with a timing relationship between an UL grant and a PUSCH, for details of which reference can be made to the 3GPP TS 36.213 protocol, although a repeated description thereof will be omitted here.

Preferably if the network-side device determines that the D2D receiving UE transmits the N2D link in the subframe n, then the network-side device receives a PUSCH from the D2d receiving UE in the subframe n.

The second approach will be described below in two instances.

First Instance:

For a PUSCH of Semi-Persistent Scheduling (SPS) over the N2D link of the D2D receiving UE, a subframe in which it is transmitted is configured by a higher layer. In a scheme, the D2D subframe, and the subframe in which a PUSCH of SPS is transmitted can be configured as subframes which do not overlap with each other. In another scheme, if the D2D subframe overlaps with the subframe in which a PUSCH of SPS is transmitted, then it can be indicated in an SPS PUSCH re-scheduling procedure, that is, a UL grant can be indicated for the PUSCH of SPS.

If the D2D subframe overlaps with the subframe in which a PUSCH of SPS is transmitted, then the eNB can determine whether a PUSCH is transmitted over the N2D link in the D2D subframe n, and if a PUSCH is transmitted over the N2D link, then the eNB will send a UL grant for the PUSCH over the N2D link, in the subframe (n-k); otherwise, the eNB will not send a UL grant for the PUSCH over the N2D link, in the subframe (n-k).

Second Instance:

In order to indicate a retransmission procedure of a PUSCH for ACK/NACK in a PHICH over the N2D link of the D2D receiving UE, since synchronous/asynchronous retransmission of a UL PUSCH is supported in the LTE system, synchronous retransmission is performed after a fixed subframe offset by receiving an indicator of the PHICH, and asynchronous retransmission is performed by scheduling retransmission in a UL grant, and indicating in an NDI whether the current PUSCH relates to a retransmitted data packet, no matter whether ACK/NACK is fed back in the corresponding PHICH at this time.

If a subframe, in which the PUSCH is retransmitted, indicated in the PHICH overlaps with the D2D subframe, then the eNB can determine whether to retransmit the PUSCH over the N2D link in the D2D subframe n, and if the PUSCH is retransmitted over the N2D link, then the eNB will send a UL grant for the PUSCH over the N2D link, in the subframe (n-k); otherwise, the eNB will send a UL grant for the PUSCH over the N2D link, in the subframe (n-k).

In a third approach, which is a combination of the first approach and the second approach, a PUSCH of the N2D link needs to be transmitted in the subframe n, where the subframe n is a subframe in which ACK/NACK feedback information corresponding to PDSCH transmission in the N2D link needs to be transmitted, and at this time, only one of the scenarios can be preset to be applied. For example, only the first approach or the second approach will be applied in the scenario in the third approach above. Alternatively either of the approaches to be applied can be determined (for example, randomly or according to a priority) and notified by the network side to the D2D receiving UE. Alternatively the network side can compare a priority of ACK/NACK feedback information with a priority of a service transmitted over the PUSCH, and if the priority of the service transmitted over the PUSCH is higher, then the second approach will be applied; otherwise, the first approach will be applied (if the D2d receiving UE also determines this according to a priority, then the network-side device may not notify the D2D receiving UE). The priorities can be set in the protocol or can be determined and then notified by the network side to the D2D receiving UE.

The network-side device according to the embodiment of the invention can be an eNB (e.g., a macro eNB, a home eNB, etc.) or can be a Relay Node (RN) device or can be another network-side device.

Here FIG. 3 and FIG. 4 can be integrated into a flow of a method for determining the type of a transmission link, that is, firstly the step 301 and then the step 401 and the step 402 are performed. Firstly the step 302 and then the steps 401 and 402 or firstly the steps 401 and 402 and then the step 302 may be performed in different applications, for example, in the first approach above as long as the step 302 is performed after the step 301; or in the second approach above as long as the step 302 is performed after the step 402.

Based the same inventive idea, embodiments of the invention further provide a system for determining the type of a transmission link, a D2D receiving UE, and a network-side device, and since these devices address the problem under a similar principle to the methods according to the embodiments of the invention, reference can be made to the implementations of the methods for implementations of these devices, although a repeated description thereof will be omitted here.

Figure 6:
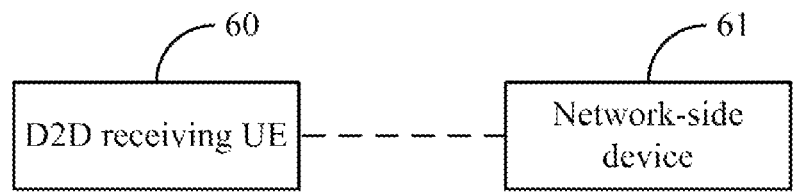
FIG. 6 illustrates a schematic structural diagram of a system for determining the type of a transmission link according to an embodiment of the invention.

As illustrated in FIG. 6, a system for determining the type of a transmission link according to an embodiment of the invention includes a D2D receiving UE 60 and a network-side device 61.

The D2D receiving UE 60 is configured to report a first resource occupancy request over an N2D link to the network-side device so that the network-side device determines the type of a transmission link of the D2D receiving UE in a subframe n upon reception of the first resource occupancy request; and to determine the type of the transmission link in the subframe n according to the type of the subframe n or received link type indication information from the network-side device, where the subframe n is a D2D subframe; and The network-side device 61 is configured to determine that there is a data transmission request of the D2D receiving UE over the N2D link, according to the first resource occupancy request over the N2D link, reported by the D2D receiving UE; and to determine the type of the transmission link of the D2D receiving UE in the subframe n, upon determining that there is a data transmission request of the D2D receiving UE over the N2D link.

Figure 7:
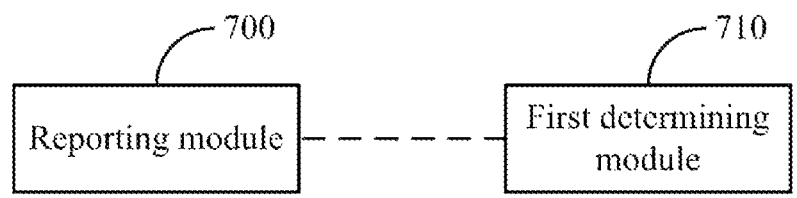
FIG. 7 illustrates a first schematic structural diagram of a D2D receiving UE according to an embodiment of the invention.

As illustrated in FIG. 7, a D2D receiving UE according to an embodiment of the invention includes a reporting module 700 and a first determining module 710.

The reporting module 700 is configured to report a first resource occupancy request over an N2D link to a network-side device so that the network-side device determines the type of a transmission link of the D2D receiving UE in a subframe n upon reception of the first resource occupancy request; and The first determining module 710 is configured to determine the type of the transmission link in the subframe n according to the type of the subframe n or received link type indication information from the network-side device, where the subframe n is a D2D subframe.

Preferably the first determining module 710 is configured:

If the subframe n is a subframe in which ACK/NACK feedback information corresponding to PDSCH transmission in the N2D link needs to be transmitted, to determine that the type of the transmission link in the subframe n is a D2D link or the N2D link, according to a preconfigured rule.

Preferably the first determining module 710 is further configured:

To perform D2D transmission in the subframe n upon determining that the type of the transmission link in the subframe n is the D2D link; or to transmit ACK/NACK feedback information corresponding to PDSCH transmission in the N2D link in the subframe n upon determining that the type of the transmission link in the subframe n is the N2D link.

Preferably the first determining module 710 is further configured:

To transmit ACK/NACK feedback information corresponding to a PDSCH in the N2D link, in an uplink subframe, available for transmission in the N2D link, subsequent to the subframe n, after performing D2D transmission in the subframe n.

Preferably the link type indication information is an indication information to schedule a Physical Uplink Shared Channel (PUSCH) transmission of the N2D link in the subframe n; and The first determining module 710 is configured:

To determine that the N2D link is transmitted in the subframe n upon reception of the link type indication information from the network-side device in a subframe (n-k).

Preferably the first determining module 710 is further configured:

To transmit the PUSCH of the N2D link in the subframe n upon determining that the type of the transmission link in the subframe n is the N2D link.

Figure 8:
FIG. 8 illustrates a first schematic structural diagram of a network-side device according to an embodiment of the invention.

As illustrated in FIG. 8, a network-side device according to an embodiment of the invention includes a receiving module 800 and a second determining module 810.

The receiving module 800 is configured to determine that there is a data transmission request of a D2D receiving UE over an N2D link, according to a first resource occupancy request over the N2D link, reported by the D2D receiving UE; and The second determining module 810 is configured to determine the type of a transmission link of the D2D receiving UE in a subframe n, upon determining that there is a data transmission request of the D2D receiving UE over the N2D link, where the subframe n is a D2D subframe.

Preferably the second determining module 810 is configured:

To determine that the D2D receiving UE transmits a D2D link or the N2D link in the subframe n, upon determining that the subframe n is a subframe in which ACK/NACK feedback information corresponding to PDSCH transmission in the N2D link needs to be transmitted.

Preferably the second determining module 810 is further configured:

If it is determined that the D2D receiving UE transmits the D2D link in the subframe n, to receive ACK/NACK feedback information corresponding to a PDSCH in the N2D link from the D2D receiving UE in an uplink subframe, available for transmission in the N2D link, subsequent to the subframe n; or if it is determined that the D2D receiving UE transmits the N2D link in the subframe n, to receive ACK/NACK feedback information corresponding to a PDSCH in the N2D link from the D2D receiving UE in the subframe n.

Preferably the second determining module 810 is configured:

To determine that a PUSCH of the N2D link needs to be transmitted in the subframe n, according to the first resource occupancy request; and to determine that the D2D receiving UE transmits the N2D link or the D2D link in the subframe n, according to a service priority or a preconfigured rule.

Preferably the second determining module 810 is configured:

To determine whether a first priority corresponding to a service transmitted in the PUSCH of the N2D link is no lower than a second priority corresponding to a service transmitted over the D2D link, where the first priority is determined by the network-side device according to the first resource occupancy request, and the second priority is determined by the network-side device according to a second resource occupancy request over the D2D link, reported by a D2D transmitting UE; and If so, to determine that the D2D receiving UE transmits the N2D link in the subframe n; otherwise, to determine that the D2D receiving UE transmits the D2D link in the subframe n.

Preferably the second determining module 810 is further configured:

If it is determined that the D2D receiving UE transmits the N2D link in the subframe n, to send an indication information to the D2D receiving UE in a subframe (n-k) to schedule PUSCH transmission of the N2D link in the subframe n.

Preferably the second determining module 810 is further configured:

If it is determined that the D2D receiving UE transmits the N2D link in the subframe n, to receive a PUSCH from the D2D receiving UE in the subframe n.

Figure 9:
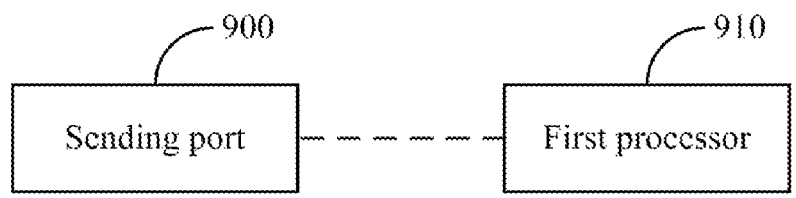
FIG. 9 illustrates a second schematic structural diagram of a D2D receiving UE according to an embodiment of the invention.

Referring to FIG. 9, a D2D receiving UE for determining the type of a transmission link according to an embodiment of the invention includes a sending port 90 and a first processor 91, where:

The sending port 90 is configured to report a first resource occupancy request over an N2D link to a network-side device so that the network-side device determines the type of a transmission link of the D2D receiving UE in a subframe n upon reception of the first resource occupancy request; and The first processor 91 is configured to determine the type of the transmission link in the subframe n according to the type of the subframe n or received link type indication information from the network-side device, where the subframe n is a D2D subframe.

Preferably the first processor 91 is configured:

If the subframe n is a subframe in which ACK/NACK feedback information corresponding to PDSCH transmission in the N2D link needs to be transmitted, to determine that the type of the transmission link in the subframe n is a D2D link or the N2D link, according to a preconfigured rule.

Preferably the first processor 91 is further configured:

To perform D2D transmission in the subframe n upon determining that the type of the transmission link in the subframe n is the D2D link; or to transmit ACK/NACK feedback information corresponding to PDSCH transmission in the N2D link in the subframe n upon determining that the type of the transmission link in the subframe n is the N2D link.

Preferably the first processor 91 is further configured:

To transmit ACK/NACK feedback information corresponding to a PDSCH in the N2D link, in an uplink subframe, available for transmission in the N2D link, subsequent to the subframe n, after performing D2D transmission in the subframe n.

Preferably the link type indication information is an indication information to schedule a Physical Uplink Shared Channel (PUSCH) transmission of the N2D link in the subframe n; and The first processor 91 is configured:

To determine that the N2D link is transmitted in the subframe n upon reception of the link type indication information from the network-side device in a subframe (n-k).

Preferably the first processor 91 is further configured:

To transmit the PUSCH of the N2D link in the subframe n upon determining that the type of the transmission link in the subframe n is the N2D link.

Figure 10:
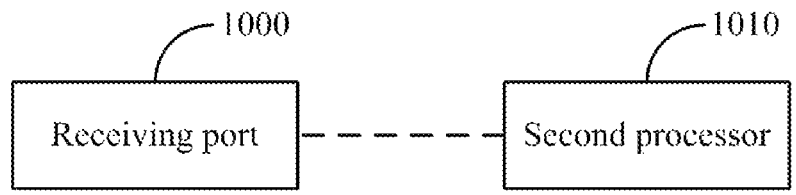
FIG. 10 illustrates a second schematic structural diagram of a network-side device according to an embodiment of the invention.

Referring to FIG. 10, a network-side device for determining the type of a transmission link according to an embodiment of the invention includes a receiving port 1000 and a second processor 1010, where:

The receiving port 1000 is configured to determine that there is a data transmission request of a D2D receiving UE over an N2D link, according to a first resource occupancy request over the N2D link, reported by the D2D receiving UE; and The second processor 1010 is configured to determine the type of a transmission link of the D2D receiving UE in a subframe n, upon determining that there is a data transmission request of the D2D receiving UE over the N2D link, where the subframe n is a D2D subframe.

Preferably the second processor 1010 is configured:

To determine that the D2D receiving UE transmits a D2D link or the N2D link in the subframe n, upon determining that the subframe n is a subframe in which ACK/NACK feedback information corresponding to PDSCH transmission in the N2D link needs to be transmitted.

Preferably the second processor 1010 is further configured:

If it is determined that the D2D receiving UE transmits the D2D link in the subframe n, to receive ACK/NACK feedback information corresponding to a PDSCH in the N2D link from the D2D receiving UE in an uplink subframe, available for transmission in the N2D link, subsequent to the subframe n; or if it is determined that the D2D receiving UE transmits the N2D link in the subframe n, to receive ACK/NACK feedback information corresponding to a PDSCH in the N2D link from the D2D receiving UE in the subframe n.

Preferably the second processor 1010 is configured:

To determine that a PUSCH of the N2D link needs to be transmitted in the subframe n, according to the first resource occupancy request; and to determine that the D2D receiving UE transmits the N2D link or the D2D link in the subframe n, according to a service priority or a preconfigured rule.

Preferably the second processor 1010 is configured:

To determine whether a first priority corresponding to a service transmitted in the PUSCH of the N2D link is no lower than a second priority corresponding to a service transmitted over the D2D link, where the first priority is determined by the network-side device according to the first resource occupancy request, and the second priority is determined by the network-side device according to a second resource occupancy request over the D2D link, reported by a D2D transmitting UE; and If so, to determine that the D2D receiving UE transmits the N2D link in the subframe n; otherwise, to determine that the D2D receiving UE transmits the D2D link in the subframe n.

Preferably the second processor 1010 is further configured:

If it is determined that the D2D receiving UE transmits the N2D link in the subframe n, to send an indication information to the D2D receiving UE in a subframe (n-k) to schedule PUSCH transmission of the N2D link in the subframe n.

Preferably the second processor 1010 is further configured:

If it is determined that the D2D receiving UE transmits the N2D link in the subframe n, to receive a PUSCH from the D2D receiving UE in the subframe n.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining type of transmission link, the method comprising:

reporting, by a Device to Device (D2D) receiving UE, a first resource occupancy request over a Network to Device (N2D) link to a network-side device so that the network-side device determines a type of a transmission link of the D2D receiving UE in a subframe n upon reception of the first resource occupancy request; and determining, by the D2D receiving UE, the type of the transmission link in the subframe n according to the type of the subframe n or received link type indication information from the network-side device, wherein the subframe n is a D2D subframe, and the type of the transmission link comprises a D2D link and the N2D link.

2. The method according to claim 1, wherein determining, by the D2D receiving UE, the type of the transmission link in the subframe n according to the type of the subframe n comprises:

if the subframe n is a subframe in which Acknowledgement (ACK)/Negative Acknowledgement (NACK) feedback information corresponding to Physical Downlink Shared Channel (PDSCH) transmission in the N2D link needs to be transmitted, then determining, by the D2D receiving UE, that the type of the transmission link in the subframe n is the D2D link or the N2D link, according to a preconfigured rule.

3. The method according to claim 2, wherein after the D2D receiving UE determines the type of the transmission link in the subframe n, the method further comprises:

performing, by the D2D receiving UE, D2D transmission in the subframe n upon determining that the type of the transmission link in the subframe n is the D2D link; or transmitting, by the D2D receiving UE, ACK/NACK feedback information corresponding to PDSCH transmission in the N2D link in the subframe n upon determining that the type of the transmission link in the subframe n is the N2D link.

4. The method according to claim 3, wherein after the D2D receiving UE performs D2D transmission in the subframe n, the method further comprises:

transmitting, by the D2D receiving UE, ACK/NACK feedback information corresponding to a PDSCH in the N2D link, in an uplink subframe, available for transmission in the N2D link, subsequent to the subframe n.

5. The method according to claim 1, wherein the link type indication information is an indication information to schedule a Physical Uplink Shared Channel (PUSCH) transmission of the N2D link in the subframe n; and determining, by the D2D receiving UE, the type of the transmission link in the subframe n according to the type of the subframe n or the received link type indication information from the network-side device comprises:

determining, by the D2D receiving UE, that the N2D link is transmitted in the subframe n upon reception of the link type indication information from the network-side device in a subframe (n-k).

6. The method according to claim 5, wherein after the D2D receiving UE determines that the N2D link is transmitted in the subframe n, the method further comprises:

transmitting, by the D2D receiving UE, the PUSCH of the N2D link in the subframe n upon determining that the type of the transmission link in the subframe n is the N2D link.

7. A method for determining type of transmission link, the method comprising:

determining, by a network-side device, that there is a data transmission request of a D2D receiving UE over an N2D link, according to a first resource occupancy request over the N2D link, reported by the D2D receiving UE; and determining, by the network-side device, a type of a transmission link of the D2D receiving UE in a subframe n, upon determining that there is a data transmission request of the D2D receiving UE over the N2D link, wherein the subframe n is a D2D subframe, and the type of the transmission link comprises a D2D link and the N2D link.

8. The method according to claim 7, wherein determining, by the network-side device, the type of the transmission link of the D2D receiving UE in the subframe n comprises:

determining, by the network-side device, that the D2D receiving UE transmits the D2D link or the N2D link in the subframe n, upon determining that the subframe n is a subframe in which ACK/NACK feedback information corresponding to PDSCH transmission in the N2D link needs to be transmitted.

9. The method according to claim 8, wherein after the network-side device determines the type of the transmission link of the D2D receiving UE in the subframe n, the method further comprises:

if the network-side device determines that the D2D receiving UE transmits the D2D link in the subframe n, then receiving, by the network-side device, ACK/NACK feedback information corresponding to a PDSCH in the N2D link from the D2D receiving UE in an uplink subframe, available for transmission in the N2D link, subsequent to the subframe n; or if the network-side device determines that the D2D receiving UE transmits the N2D link in the subframe n, then receiving, by the network-side device, ACK/NACK feedback information corresponding to a PDSCH in the N2D link from the D2D receiving UE in the subframe n.

10. The method according to claim 7, wherein determining, by the network-side device, the type of the transmission link of the D2D receiver in the subframe n comprises:

determining, by the network-side device, that a PUSCH of the N2D link needs to be transmitted in the subframe n, according to the first resource occupancy request; and determining, by the network-side device, that the D2D receiving UE transmits the N2D link or the D2D link in the subframe n, according to a service priority or a preconfigured rule.

11. The method according to claim 10, wherein determining, by the network-side device, that the D2D receiving UE transmits the N2D link or the D2D link in the subframe n, according to a service priority comprises:

determining, by the network-side device, whether a first priority corresponding to a service transmitted in the PUSCH of the N2D link is no lower than a second priority corresponding to a service transmitted over the D2D link, wherein the first priority is determined by the network-side device according to the first resource occupancy request, and the second priority is determined by the network-side device according to a second resource occupancy request over the D2D link, reported by a D2D transmitting UE; and if so, then determining that the D2D receiving UE transmits the N2D link in the subframe n; otherwise, determining that the D2D receiving UE transmits the D2D link in the subframe n.

12. The method according to claim 10, wherein after the network-side device determines the type of the transmission link of the D2D receiving UE in the subframe n, the method further comprises:

if the network-side device determines that the D2D receiving UE transmits the N2D link in the subframe n, then sending, by the network-side device, an indication information to the D2D receiving UE in a subframe (n-k) to schedule PUSCH transmission of the N2D link in the subframe n.

13. The method according to claim 10, wherein after the network-side device determines the type of the transmission link of the D2D receiving UE in the subframe n, the method further comprises:

if the network-side device determines that the D2D receiving UE transmits the N2D link in the subframe n, then receiving, by the network-side device, a PUSCH from the D2D receiving UE in the subframe n.

14. A D2D receiving UE for determining type of transmission link, the D2D receiving UE comprising a sending port and a processor, wherein:

the sending port configured to report a first resource occupancy request over an N2D link to a network-side device so that the network-side device determines a type of a transmission link of the D2D receiving UE in a subframe n upon reception of the first resource occupancy request; and the processor configured to determine the type of the transmission link in the subframe n according to the type of the subframe n or received link type indication information from the network-side device, wherein the subframe n is a D2D subframe, and the type of the transmission link comprises a D2D link and the N2D link.

15. The D2D receiving UE according to claim 14, wherein the processor is configured:

if the subframe n is a subframe in which ACK/NACK feedback information corresponding to PDSCH transmission in the N2D link needs to be transmitted, to determine that the type of the transmission link in the subframe n is the D2D link or the N2D link, according to a preconfigured rule.

16. The D2D receiving UE according to claim 15, wherein the processor is further configured:

to perform D2D transmission in the subframe n upon determining that the type of the transmission link in the subframe n is the D2D link; or to transmit ACK/NACK feedback information corresponding to PDSCH transmission in the N2D link in the subframe n upon determining that the type of the transmission link in the subframe n is the N2D link.

17. The D2D receiving UE according to claim 16, wherein the processor is further configured:

to transmit ACK/NACK feedback information corresponding to a PDSCH in the N2D link, in an uplink subframe, available for transmission in the N2D link, subsequent to the subframe n, after performing D2D transmission in the subframe n.

18. The D2D receiving UE according to claim 14, wherein the link type indication information is an indication information to schedule a Physical Uplink Shared Channel (PUSCH) transmission of the N2D link in the subframe n; and the processor is configured:

to determine that the N2D link is transmitted in the subframe n upon reception of the link type indication information from the network-side device in a subframe (n-k).

19. The D2D receiving UE according to claim 18, wherein the processor is further configured:

to transmit the PUSCH of the N2D link in the subframe n upon determining that the type of the transmission link in the subframe n is the N2D link.

* * * * *